(12) United States Patent
Malinge

(10) Patent No.: US 10,924,700 B2
(45) Date of Patent: Feb. 16, 2021

(54) GLOBAL SHUTTER IMAGER DEVICE

(71) Applicant: STMicroelectronics (Crolles 2) SAS, Crolles (FR)

(72) Inventor: Pierre Malinge, Bernin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 16/599,875

(22) Filed: Oct. 11, 2019

(65) Prior Publication Data

US 2020/0128204 A1 Apr. 23, 2020

(30) Foreign Application Priority Data

Oct. 17, 2018 (FR) .................................... 1859583

(51) Int. Cl.
*H04N 5/3745* (2011.01)
*H04N 5/235* (2006.01)
*G09G 5/42* (2006.01)

(52) U.S. Cl.
CPC .......... *H04N 5/37452* (2013.01); *G09G 5/42* (2013.01); *H04N 5/2353* (2013.01); *G09G 2300/0847* (2013.01)

(58) Field of Classification Search
CPC .. H04N 5/37452; H04N 5/2353; H04N 5/369; H04N 5/357; H04N 5/363; G09G 5/42; G09G 2300/0847
See application file for complete search history.

(56) References Cited

U.S. PATENT DOCUMENTS

| | | | |
|---|---|---|---|
| 2002/0190215 A1* | 12/2002 | Tashiro | H04N 5/37452 250/370.11 |
| 2009/0114919 A1* | 5/2009 | Kawahito | G01C 3/08 257/59 |
| 2016/0088251 A1 | 3/2016 | Luo et al. | |
| 2018/0166477 A1* | 6/2018 | Raynor | H01L 27/14621 |
| 2019/0014278 A1* | 1/2019 | Kumagai | H04N 5/37452 |

FOREIGN PATENT DOCUMENTS

JP 2002344809 A 11/2002

OTHER PUBLICATIONS

INPI Search Report and Written Opinion for FR 1859583 dated Jul. 31, 2019 (8 pages).

* cited by examiner

*Primary Examiner* — Nhan T Tran
(74) *Attorney, Agent, or Firm* — Crowe & Dunlevy

(57) ABSTRACT

A pixel of an imager device includes a photosensitive area configured to integrate a light signal. A first capacitive storage node is configured to receive a signal representative of the number of charges generated by the photosensitive area. A second capacitive storage node is configured to receive a reference signal. A first transfer transistor is coupled between the first capacitive storage node and the photosensitive area. A second transfer transistor is coupled between the second capacitive storage node and a terminal which supplied the reference signal. The first and second two transfer transistors have a common conduction electrode and a common substrate, wherein the common substrate is coupled to the first capacitive storage node.

25 Claims, 2 Drawing Sheets

GLOBAL SHUTTER IMAGER DEVICE

PRIORITY CLAIM

This application claims the priority benefit of French Application for Patent No. 1859583, filed on Oct. 17, 2018, the content of which is hereby incorporated by reference in its entirety to the maximum extent allowable by law.

TECHNICAL FIELD

Implementations and embodiments relate to integrated circuits and more particularly global shutter imager integrated circuits including a matrix of pixels.

BACKGROUND

Imager circuits conventionally include a matrix of pixels, each pixel of which includes photodiode and a transfer circuit configured to transfer the charge from the pixel to a processing circuit.

The processing circuit can, for example, comprise an analog-to-digital converter.

In global shutter imager circuits, the charges of the pixels can be transferred simultaneously.

The transfer comprises a phase for storing the charges, for example, in the form of a voltage.

In such imagers, each column of the matrix of pixels is associated with a processing circuit, which will successively be connected to each pixel of the column in order to simultaneously transfer the charges of all the pixels.

Under low-luminosity conditions, the photodiode generates a low number of charges. The weak signal representative of the number of charges is distorted by noise and by leakage currents of the transistors contained in each pixel.

There is therefore a need to recover as undistorted a signal as possible in order to send it to the processing circuit.

SUMMARY

According to one aspect, there is proposed an imager device including a matrix of pixels in which each pixel comprises:
  a photosensitive area configured to integrate a light signal;
  a terminal configured to deliver a reference signal (for example, a reference voltage);
  a first capacitive storage node configured to receive a signal representative of the number of charges generated by the photosensitive area;
  a second capacitive storage node configured to receive the reference signal;
  a first transfer transistor coupled between the first capacitive storage node and the photosensitive area, and a second transfer transistor coupled between the second capacitive storage node and the terminal, the two transfer transistors having a common conduction electrode and a common substrate, the common substrate being coupled to the first capacitive storage node.

"Coupling" is understood to mean a direct or indirect electrical connection via other components.

The reference voltage is advantageously a voltage for initializing a node of the pixel enabling charges to later be transferred outside the photosensitive area.

Since the first capacitive storage node is coupled to the common substrate of the two transistors, this provides for placing the substrate and the first storage node at the same voltage.

Under conditions of low luminosity, the junctions of the two transistors exhibit, by virtue of this coupling, low leakage currents commonly referred to as "dark currents".

According to one embodiment, the two transfer transistors are coupled in parallel.

According to another possible embodiment, the two transfer transistors are coupled in series.

According to one embodiment, the common substrate is reverse-biased.

Reverse-biasing the substrate provides for further reducing the leakage currents at the junctions of the two transistors. Advantageously, the reverse voltage applied to the substrate can for example be between 10 mV and 300 mV.

BRIEF DESCRIPTION OF THE DRAWINGS

Other advantages and features of the invention will become clearer upon reading the detailed description of embodiments, which are not at all limiting, and from the accompanying drawings in which.

DETAILED DESCRIPTION

Figure 1:
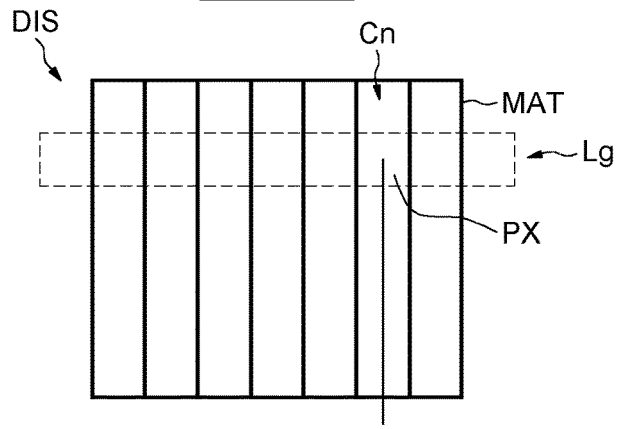
FIG. 1 illustrates an example embodiment of an imager device including a matrix MAT of pixels.

FIG. 1 illustrates an example embodiment of an imager device DIS including a matrix MAT of pixels PX containing several columns Cn, for example a number of columns greater than a thousand. The matrix MAT also comprises several rows Lg.

Each column Cn is coupled to processing circuit configured to carry out operations on the signals extracted from the pixels when they are read, for example analog-to-digital conversion operations, and to a biasing circuit, for example current sources, configured to deliver a substantially identical and advantageously stable biasing current on each column of the matrix.

"Substantially identical" is understood to mean, for example, equality with a margin of error of less than 10%.

A "stable" current is understood to be a current for which the variations in intensity remain lower than 1%.

Figure 2:
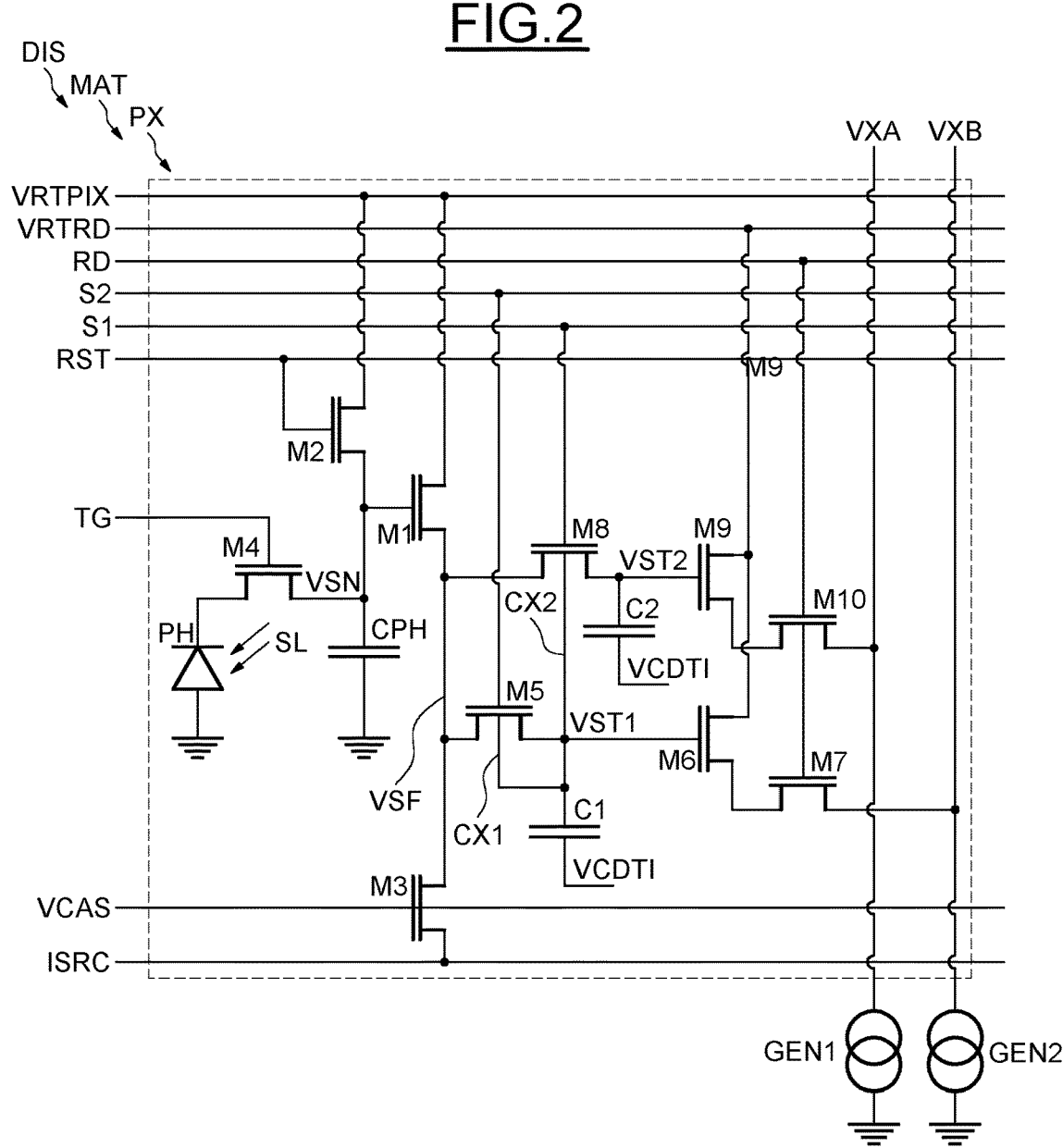
FIG. 2 illustrates an example embodiment of a pixel of the matrix.

FIG. 2 illustrates an example embodiment of a pixel PX of the matrix MAT.

For simplification, only two columns VXA and VXB are represented here.

The biasing circuit here comprises current sources GEN1 and GEN2.

For example, the current source GEN1 is configured to deliver a biasing current on the column VXA and the current source GEN2 is configured to deliver a biasing current on the column VXB.

Each pixel PX of the matrix has a conventional structure and is known per se. The pixel can advantageously be a pixel having two capacitive storage nodes, in this case the nodes VST1 and VST2.

The pixel PX illustrated has a "10T" structure including 10 transistors M1 to M10 and a photosensitive area PH, for example a photodiode configured to integrate a light signal SL.

The first transistor M1 has a first conduction electrode coupled to a terminal VRTPIX and a second conduction electrode coupled to a first conduction electrode of the third transistor M3 via a connection VSF.

The terminal VRTPIX is configured to deliver a reference voltage to the first conduction electrode of the first transistor M1. This voltage is advantageously around 2.5 V.

The transistor M1 acts as a basic amplifier.

The second transistor M2 also has a first conduction electrode coupled to the terminal VRTPIX, and a second conduction electrode coupled to the gate of the first transistor M1.

The gate of the second transistor M2 is controlled by a control signal RST.

The second conduction electrode of the second transistor M2 is also coupled to a node VSN configured to carry out a charge-voltage conversion.

The reference voltage in this case provides for setting the potential of the node VSN to a high value. This will henceforth provide for transferring charges outside the photosensitive area PH.

To carry out the charge-voltage conversion, the node VSN is coupled to a capacitor CPH configured to store the charges.

The third transistor M3 has a first conduction electrode coupled to the second conduction electrode of the first transistor M1.

The second conduction electrode of the third transistor M3 is coupled to a current source ISRC.

The transistor M3 receives on its gate a biasing voltage delivered by a node VCAS. It is advantageously around 1V.

The gate of the transistor M4 is controlled by a control signal TG and its first conduction electrode is coupled to the photosensitive area PH.

The second conduction electrode of the transistor M4 is coupled to the node VSN.

The fifth transistor M5 corresponding to a first transfer transistor has its gate controlled by a control signal S2, its first conduction electrode coupled to the first electrode of the third transistor M3 and its second conduction electrode coupled to the first capacitive storage node VST1.

The first capacitive storage node VST1 is also coupled via a connection CX1 to the substrate of the fifth transistor M5.

The first capacitive storage node VST1 is configured to receive a signal representative of the number of charges generated by the photosensitive area PH. It is coupled to a first capacitor C1 coupled to a voltage source VCDTI advantageously delivering a voltage of around −1V.

The sixth transistor M6 has its gate coupled to the first capacitive storage node VST1, its first conduction electrode coupled to a node VRTRD and its second conduction electrode coupled to a first conduction electrode of the seventh transistor M7.

The seventh transistor M7 has its second conduction electrode coupled to the column VXB.

The eighth transistor M8 corresponds to a second transfer transistor.

The eighth transistor M8 has its gate controlled by a control signal S1, its first conduction electrode coupled to the second electrode of the first transistor M1 and its second conduction electrode coupled to the second capacitive storage node VST2.

The second capacitive storage node VST2 is also coupled via a connection CX2 to the substrate of the eighth transistor M8.

It is to be noted that the two transfer transistors are coupled in parallel. Specifically, two first conduction electrodes of the two transfer transistors are connected via the connection VSF and the two other conduction electrodes share the same voltage source VCDTI.

The second capacitive storage node VST2 is configured to receive a reference signal, in this particular case the reference signal present on the terminal VRTPIX. It is coupled to a second capacitor C2 coupled to the voltage source VCDTI.

The ninth transistor M9 has its gate coupled to the second capacitive storage node VST2, its first conduction electrode coupled to the node VRTRD and its second conduction electrode coupled to a first conduction electrode of the tenth transistor M10.

The tenth transistor M10 has its gate controlled by a control signal RD and its second electrode is coupled to the column VXA.

It is to be noted that the transistors M1 to M4, M6, M7, M9 and M10 have a common substrate coupled to ground.

The transistors M5 and M8 also have a common substrate that is reverse-biased and isolated from the substrate that the other transistors share.

The operation of the 10T structure is described in a succinct way as follows:

Before the integration period starts, the control signal TG is in the high state. This provides for avoiding parasitic charges from being retained at the photosensitive area PH.

The control signal TG then changes to the low state once the integration period has started.

"Integration period" is understood to mean the period for acquiring a value representative of the illumination level of the photosensitive area PH.

The photosensitive area PH integrates the light signal SL but does not transmit the charges generated to the node VSN, the fourth transistor M4 controlled by the control signal TG being non-conducting.

Since the control signal RST is in the high state, the second transistor M2 is conducting. The node VSN has a voltage equal to that delivered by the terminal VRTPIX. This is the reference signal which has a high noise component.

When the control signal RST changes to the low state and the control signal S1 to the high state, the first transistor M1 copies the voltage of its gate onto its second conduction electrode at node VSF coupled to the first conduction electrode of the eighth transistor M8 which is conducting.

The control signal S2 is in the low state blocking the transistor M5.

The reference signal is therefore transferred to the second capacitive storage node VST2. The control signal S1 changes to the low state and blocks the eighth transistor M8.

At the end of the integration period, the control signal TG changes to the high state and makes the fourth transistor M4 conducting. The photogenerated charges in the area PH are therefore transferred to the capacitor CPH and the node VSN receives a signal representative of the number of charges generated by the photosensitive area PH.

The control signal TG changes to the low state and the control signal S2 to the high state. The first transistor M1 is configured to substantially copy the voltage of its gate onto its second conduction electrode at node VSF coupled to the first conduction electrode of the fifth transistor M5 which is conducting.

The signal representative of the number of charges generated by the photosensitive area PH is hence transferred to the first capacitive storage node VST1.

The reference signal and the signal representative of the number of charges generated by the photosensitive area PH are then read. To that end, the ninth and tenth transistors M9, M10 provide for copying the reference signal present in the second storage node VST2 onto the column VXA, and the sixth and seventh transistors M6, M7 provide for copying the signal representative of the charges generated by the photosensitive area PH onto the column VXB.

The noise present in the first storage node VST1 and in the second storage node VST2 will be removed by the processing circuit.

Figure 3:
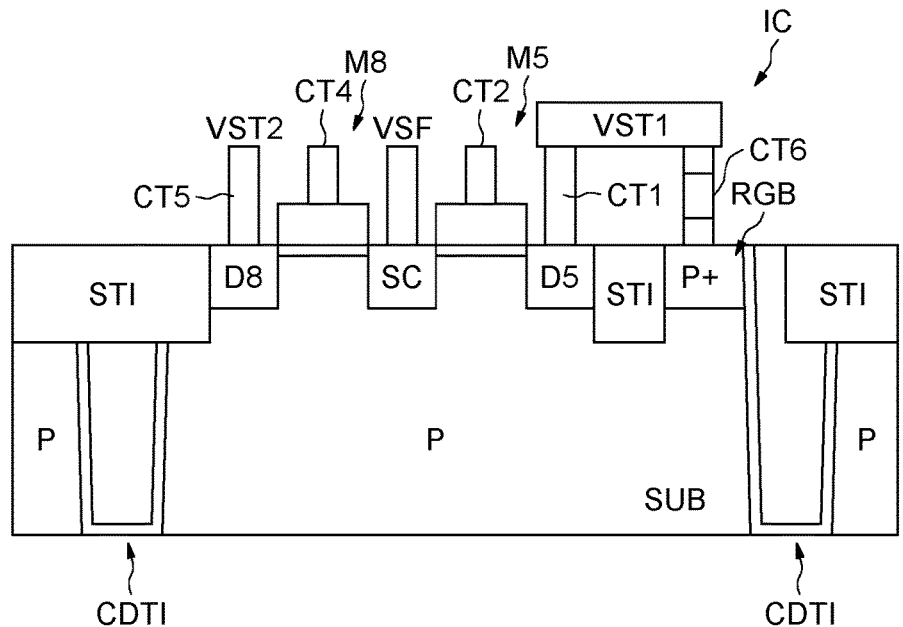
FIG. 3 is a cross-sectional view schematically illustrating how a part of the pixel of FIG. 2 is produced on and in a semiconductor substrate.

Reference is now made more particularly to FIG. 3 which is a cross-sectional view schematically illustrating how a part of the pixel of FIG. 2 is produced on and in a semiconductor substrate SUB, for example a massive substrate or of the silicon-on-insulator type, of an integrated circuit IC.

The substrate SUB, in this case P-type, forms a common substrate only for the two transfer transistors M5 and M8.

A first contact CT1 is connected to the drain D5 of the first transfer transistor M5 and a second contact CT2 provides for connecting the gate of the first transfer transistor M5 to the line conveying the control signal S2.

The two transistors M5 and M8 have a common conduction electrode, in this case the source SC.

A contact VSF is connected to the source SC.

A fourth contact CT4 is also illustrated connecting the gate of the second transfer transistor M8 to the line conveying the control signal S1, and a fifth contact CT5 is connected to the drain D8 of the second transfer transistor M8 and provides for connecting it to the second capacitive storage node VST2.

The substrate SUB includes an overdoped, P+, region RGB connected to the drain D5 of the transistor M5 via a sixth contact CT6, a metal track portion VST1 and the contact CT1.

As such, the drain D5 of the first transfer transistor M5 is connected to the substrate SUB, common to the two transistors M5 and M8.

Moreover, the metal track portion VST1 forms the first capacitive storage node which is well connected to the substrate of the transistor M5.

By connecting the first capacitive storage node VST1 to the substrate SUB of the two transfer transistors, the leakage currents of the PN junctions of the two transistors are reduced.

The substrate SUB is surrounded by a first insolating region CDTI (for "Capacitor Deep Trench Isolation") of conventional structure, which includes a capacitive trench.

The substrate SUB also comprises in a conventional way isolating regions STI, for example shallow isolation trenches.

Figure 4:
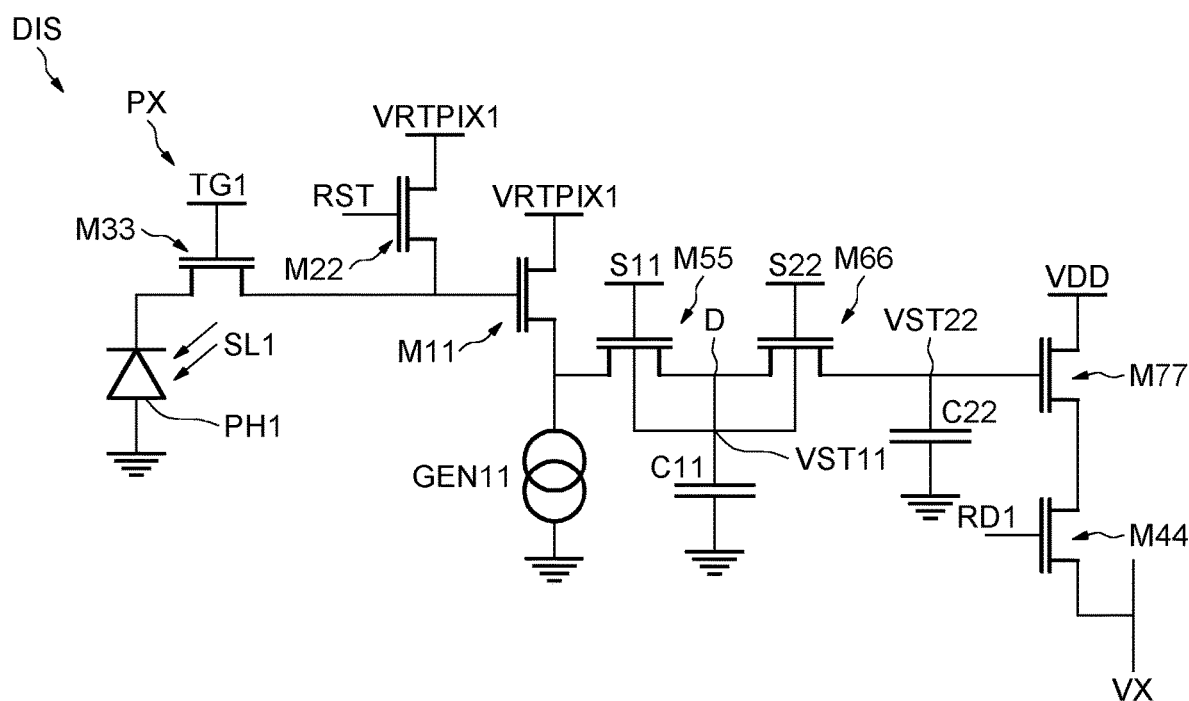
FIG. 4 illustrates an example embodiment of an imager device in which the two transfer transistors for each pixel are coupled in series.

While in the embodiment illustrated in FIG. 2 the two transfer transistors are connected in parallel, FIG. 4 illustrates an example embodiment of an imager device DIS in which the two transfer transistors for each pixel PX are coupled in series.

The device includes a matrix of pixels. Each pixel PX comprises several columns.

For simplification, only one column VX is represented.

The architecture represented here is another type of architecture, typically an 8T architecture.

The column VX is coupled to processing circuit to carry out operations on the signals extracted from the pixels when they are read, for example analog-to-digital conversion operations, and to biasing circuit, in this case a current source GEN11.

The pixel PX comprises here a structure including a first transistor M11, a second transistor M22, a third transistor M33, a fourth transistor M44, a fifth transistor M55, a sixth transistor M66 and a seventh transistor M77.

The fifth transistor M55 is a first transfer transistor and the sixth transistor M66 is a second transfer transistor.

The first transistor M11 acts as a basic amplifier.

The pixel PX comprises a photosensitive area PH1 configured to integrate a light signal SL1.

The first transistor M11 has a first conduction electrode coupled to a terminal VRTPIX1 configured to deliver a reference signal, and a second conduction electrode coupled to the current generator GEN11.

The second transistor M22 has a first conduction electrode coupled to the terminal VRTPIX1 and a second conduction electrode coupled to the gate of the first transistor M11.

The second transistor M22 has its gate controlled by a control signal RST.

The third transistor M33 has a first conduction electrode coupled to the photosensitive area PH1 and a second conduction electrode coupled to the second conduction electrode of the second transistor M22 and to the gate of the first transistor M11.

The third transistor M33 has its gate controlled by a control signal TG1.

The first transfer transistor M55 has a first conduction electrode coupled to the second conduction electrode of the first transistor M11, and a second conduction electrode common with the second transfer transistor M66. The second conduction electrode is a common drain D.

The first transfer transistor M55 and the second transfer transistor M66 are therefore coupled in series via their common drain D.

A first capacitor C11 has its electrode coupled to the common conduction electrode, the drain D, of the first and second transfer transistors M55, M66.

The first and second transfer transistors M55, M66 each have their substrate coupled to a first capacitive storage node VST11.

The first transfer transistor M55 has its control electrode coupled to a control signal S11 and the second transfer transistor M66 has its control electrode coupled to a control signal S22.

The capacitive storage node VST11 is coupled to one of the electrodes of the first capacitor C11 and to the drain D common to the two transfer transistors M55 and M66.

The second transistor M66 has a second conduction electrode coupled to a second capacitive storage node VST22. The second capacitive storage node VST22 is coupled to an electrode of a second capacitor C22.

The second electrode is also coupled to the gate of the seventh transistor M77.

The seventh transistor M77 has its first conduction electrode coupled to a terminal VDD delivering a voltage, and its second conduction electrode coupled to the first electrode of the fourth transistor M44.

The fourth transistor M44 has a second conduction electrode coupled to the column VX and its gate controlled by a control signal RD1.

The operation of the structure is described in a succinct way as follows:

First, at the start of the integration period, the control signal TG1 is in the low state.

The photosensitive area PH1 integrates the light signal SL1 but does not transmit the charges generated, the third transistor M33 being in a non-conducting state.

Since the control signal RST is in the high state, the second transistor M22 is conducting. It lets the reference signal delivered by the terminal VRTPIX1 to pass.

The first transistor M11 is also conducting and substantially copies the signal VRTPIX1 onto its second conduction electrode.

The control signals S11 and S22 are simultaneously in the high state, thereby providing for storing the charges representative of the reference signal in the second capacitor C22.

The second capacitive storage node VST22 therefore receives the reference signal delivered by the terminal VRTPIX1.

The control signal RST changes to the low state and the control signal S22 to the low state also. The second transistor M22 and the transistor M66 are blocked.

At the end of the integration period, the control signal TG1 changes to the high state and makes the third transistor M33 conducting.

The charges generated by the photosensitive area PH1 are therefore transferred to the first capacitor C11.

The control signal TG1 changes to the low state. The third transistor M33 is blocked.

To read the reference signal of the second capacitive storage node VST22, the control signal RD1 changes to the high state. The fourth transistor M44 becomes conducting and allows the reference signal to be transferred to the column VX.

To read the signal representative of the charges generated by the photosensitive area PH1, the control signal S22 changes to the high state and the second transfer transistor M66 becomes conducting.

The reading of the signal representative of the charges generated by the photosensitive area PH1 is carried out by the column VX.

Moreover, although a pixel having a 10T and 8T structure has been described, the invention is not limited to these two embodiments but applies to any structure comprising two capacitive storage nodes.

The invention claimed is:

1. An imager device including a matrix of pixels, wherein each pixel comprises:
a photosensitive area configured to integrate a light signal;
a terminal configured to deliver a reference signal;
a first capacitive storage node configured to receive a signal representative of the number of charges generated by the photosensitive area;
a second capacitive storage node configured to receive the reference signal;
a first transfer transistor coupled to selectively pass the integrated light signal from the photosensitive area to the first capacitive storage node; and
a second transfer transistor coupled selectively pass the reference signal from the terminal to the second capacitive storage node;
wherein the first and second transfer transistors have a common conduction electrode and a common substrate, and wherein a potential at the first capacitive storage node is applied to the common substrate.

2. The imager device according to claim 1, wherein the first and second transfer transistors are coupled in parallel.

3. The imager device according to claim 2, wherein the common substrate is reverse-biased through a capacitor forming the first capacitive storage node, said capacitor having a first plate coupled to the first capacitive storage node and a second plate coupled to receive a reverse-bias signal.

4. The imager device according to claim 2, wherein the second capacitive storage node is reverse-biased through a capacitor, said capacitor having a first plate coupled to the second capacitive storage node and a second plate coupled to receive a reverse-bias signal.

5. The imager device according to claim 1, wherein the first and second transfer transistors are coupled in series.

6. The imager device according to claim 5, wherein the common substrate is grounded through a capacitor forming the first capacitive storage node, said capacitor having a first plate coupled to the first capacitive storage node and a second plate coupled to ground.

7. The imager device according to claim 5, wherein the second capacitive storage node is grounded through a capacitor, said capacitor having a first plate coupled to the second capacitive storage node and a second plate coupled to ground.

8. The imager device according to claim 1, further comprising:
a third transfer transistor coupled to selectively pass the integrated light signal from the photosensitive area to a sense node; and
an amplifier transistor having a control terminal coupled to the sense node, a first conduction terminal coupled to receive the reference signal and a second conduction terminal coupled to the common conduction electrode of the first and second transfer transistors.

9. The imager device according to claim 8, wherein the third transfer transistor and the amplifier transistor have a common substrate, the common substrate being coupled to ground.

10. The imager device according to claim 1, wherein the common substrate is doped with a first conductivity type and further including:
a contact region in said common substrate that is over-doped with the first conductivity type; and
an electrical connection from a first plate of a capacitor forming said first capacitive storage node to the contact region.

11. The imager device according to claim 10, wherein said drain terminal comprises a drain region in the common substrate doped with a second conductivity type opposite the first conductivity type, and further comprising a further electrical connection from said drain region to the first plate of the capacitor.

12. An imager device including a matrix of pixels, wherein each pixel comprises:
a photosensitive circuit configured to integrate a light signal and produce a light sense voltage at a common node;
a reference circuit configured to deliver a reference voltage to the common node;
a first transfer transistor having a source terminal at the common node and a drain terminal at a first capacitive storage node, wherein the first transfer transistor is selectively actuated to transfer the light sense voltage at the common node to a first capacitor at the first capacitive storage node;
a second transfer transistor having a source terminal at the common node and a drain terminal at a second capacitive storage node, wherein the second transfer transistor is selectively actuated to transfer the reference voltage at the common node to a second capacitor at the second capacitive storage node;
wherein the first and second transfer transistors have a common substrate, and wherein a potential at the first capacitive storage node is applied to the common substrate.

13. The imager device according to claim 12, wherein the common substrate is reverse-biased through a capacitor forming the first capacitive storage node, said capacitor having a first plate coupled to the first capacitive storage node and a second plate coupled to receive a reverse-bias signal.

14. The imager device according to claim 13, wherein the second capacitive storage node is reverse-biased through a capacitor, said capacitor having a first plate coupled to the second capacitive storage node and a second plate coupled to receive a reverse-bias signal.

15. The imager device according to claim 12, further comprising:
    a third transfer transistor coupled to selectively pass the integrated light signal from a photosensitive area of the photosensitive circuit to a sense node; and
    an amplifier transistor having a control terminal coupled to the sense node, a first conduction terminal coupled to receive the reference signal and a second conduction terminal coupled to the common node.

16. The imager device according to claim 15, wherein the third transfer transistor and the amplifier transistor have a common substrate, the common substrate being coupled to ground.

17. The imager device according to claim 12, wherein the common substrate is doped with a first conductivity type and further including:
    a contact region in said common substrate that is overdoped with the first conductivity type; and
    an electrical connection from a first plate of a capacitor forming said first capacitive storage node to the contact region.

18. The imager device according to claim 17, wherein said drain terminal comprises a drain region in the common substrate doped with a second conductivity type opposite the first conductivity type, and further comprising a further electrical connection from said drain region to the first plate of the capacitor.

19. An imager device including a matrix of pixels, wherein each pixel comprises:
    a photosensitive circuit configured to integrate a light signal and produce a light sense voltage at a first node;
    a reference circuit configured to deliver a reference voltage to the first node;
    a first transfer transistor having a source terminal at the first node and a drain terminal at a first capacitive storage node, wherein the first transfer transistor is selectively actuated to transfer the light sense voltage at the first node to a first capacitor at the first capacitive storage node;
    a second transfer transistor having a drain terminal at the first capacitive storage node and a source terminal at a second capacitive storage node, wherein the second transfer transistor is selectively actuated to transfer the reference voltage at the first node to a second capacitor at the second capacitive storage node;
    wherein the first and second transfer transistors have a common substrate, and wherein a potential at the first capacitive storage node is applied to the common substrate.

20. The imager device according to claim 19, wherein the common substrate is grounded through a capacitor forming the first capacitive storage node, said capacitor having a first plate coupled to the first capacitive storage node and a second plate coupled to ground.

21. The imager device according to claim 20, wherein the second capacitive storage node is grounded through a capacitor, said capacitor having a first plate coupled to the second capacitive storage node and a second plate coupled to ground.

22. The imager device according to claim 19, further comprising:
    a third transfer transistor coupled to selectively pass the integrated light signal from a photosensitive area of the photosensitive circuit to a sense node; and
    an amplifier transistor having a control terminal coupled to the sense node, a first conduction terminal coupled to receive the reference signal and a second conduction terminal coupled to the first node.

23. The imager device according to claim 22, wherein the third transfer transistor and the amplifier transistor have a common substrate, the common substrate being coupled to ground.

24. The imager device according to claim 19, wherein the common substrate is doped with a first conductivity type and further including:
    a contact region in said substrate that is overdoped with the first conductivity type; and
    an electrical connection from a first plate of a capacitor forming said first capacitive storage node to the contact region.

25. The imager device according to claim 24, wherein said drain terminal comprises a drain region in the common substrate doped with a second conductivity type opposite the first conductivity type, and further comprising a further electrical connection from said drain region to the first plate of the capacitor.

* * * * *